United States Patent [19]
Larson et al.

[11] Patent Number: 5,825,854
[45] Date of Patent: Oct. 20, 1998

[54] TELEPHONE ACCESS SYSTEM FOR ACCESSING A COMPUTER THROUGH A TELEPHONE HANDSET

[75] Inventors: James A Larson; Scott Boss; Murali Veeramoney, all of Beaverton; Mike Rosenweig, Portland; Roger Hurwitz, Hillsboro; Scott Colville, Beaverton, all of Oreg.; T. V. Raman, Ithaca, N.Y.

[73] Assignee: Intel Corporation, Santa Clara, Calif.

[21] Appl. No.: 787,319

[22] Filed: Jan. 24, 1997

Related U.S. Application Data

[63] Continuation of Ser. No. 594,333, Jan. 30, 1996, abandoned, which is a continuation of Ser. No. 385,193, Feb. 6, 1995, abandoned, which is a continuation of Ser. No. 135,018, Oct. 12, 1993, abandoned.

[51] Int. Cl.⁶ ..................................................... H04M 1/64
[52] U.S. Cl. ....................... 379/67; 379/93.24; 379/93.76
[58] Field of Search ................................. 379/67, 88, 89, 379/93.24, 93.26, 100.08, 100.15; 395/2.69, 2.73, 2.79; 704/260, 264, 270

[56] References Cited

U.S. PATENT DOCUMENTS

| | | | |
|---|---|---|---|
| 4,489,429 | 12/1984 | Hashimoto | 395/2.69 |
| 4,653,100 | 3/1987 | Barnett et al. | 395/2.69 X |
| 4,674,115 | 6/1987 | Kaleita et al. | 379/199 |
| 4,716,583 | 12/1987 | Groner et al. | 379/94 X |
| 4,785,408 | 11/1988 | Britton et al. | 379/97 X |
| 4,837,798 | 6/1989 | Cohen et al. | 379/94 X |
| 4,899,369 | 2/1990 | Konziela | 379/101 |
| 4,974,254 | 11/1990 | Perine et al. | 379/100 |
| 4,996,707 | 2/1991 | O'Malley et al. | 379/100 |
| 5,031,206 | 7/1991 | Riskin | 379/97 |
| 5,136,634 | 8/1992 | Rae et al. | 379/100 |
| 5,179,585 | 1/1993 | MacMillan, Jr. et al. | 379/89 X |
| 5,187,735 | 2/1993 | Herrero Garcia et al. | 379/212 |
| 5,309,509 | 5/1994 | Cocklin et al. | 379/165 |
| 5,321,737 | 6/1994 | Patsiokas | 379/63 X |

FOREIGN PATENT DOCUMENTS 3210870  9/1991  Japan .

OTHER PUBLICATIONS

"VoxMail 1.6 User Reference," VoxLink Corporation. Jun. 1993.

Groner, "The Telephone—The Ultimate Terminal" Jun. 4, 1984 Telephony, pp. 34–40.

AT&T Information Systems, "Audix" Jan. 1989, pp. 1–5.

*Primary Examiner*—Daniel S. Hunter
*Attorney, Agent, or Firm*—Blakely, Sokoloff, Taylor & Zafman

[57] ABSTRACT

A telephone access system which provides remote access and communication with a computer through a telephone handset. The system provides audio instructions to the user to select between a plurality of audio dialogs. The audio dialogs may provide access to voice mail, electronic mail, a file manager (documents, databases, etc.) and facsimiles all stored within the computer. Once within an audio dialog, the system provides a series of instructions which allows the user to manipulate the information stored within the computer. For example, the system may allow the user to listen to a message received through electronic mail and then reply to the message. The system may also allow the user to remotely listen to the text of a document and FAX the document to a location remote from the computer.

20 Claims, 9 Drawing Sheets

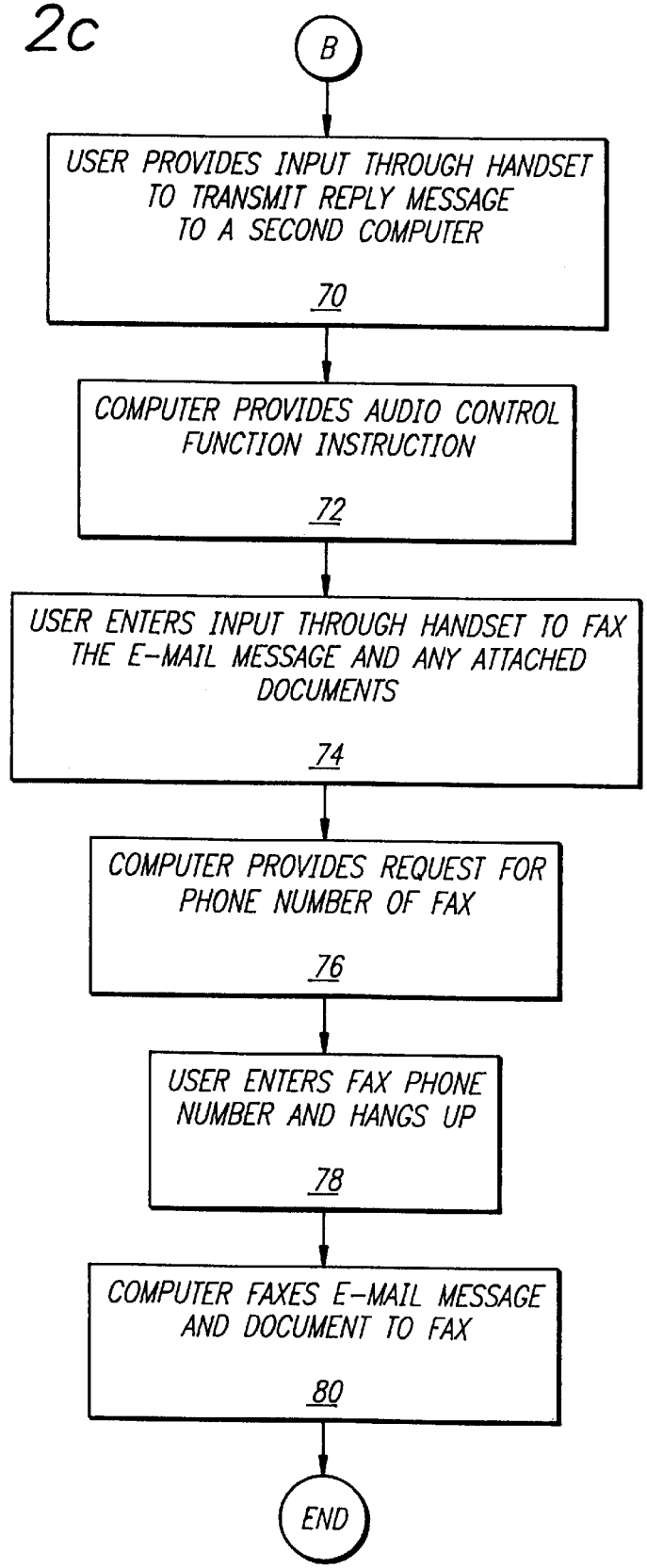

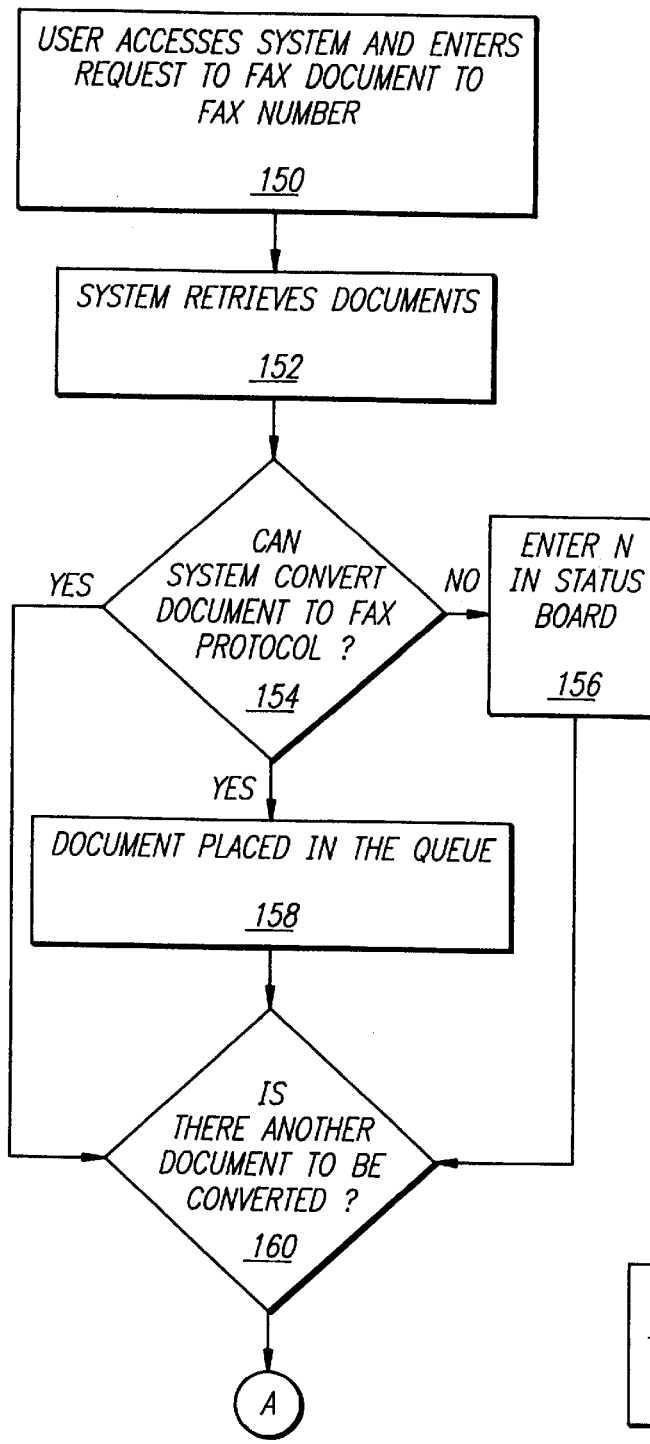
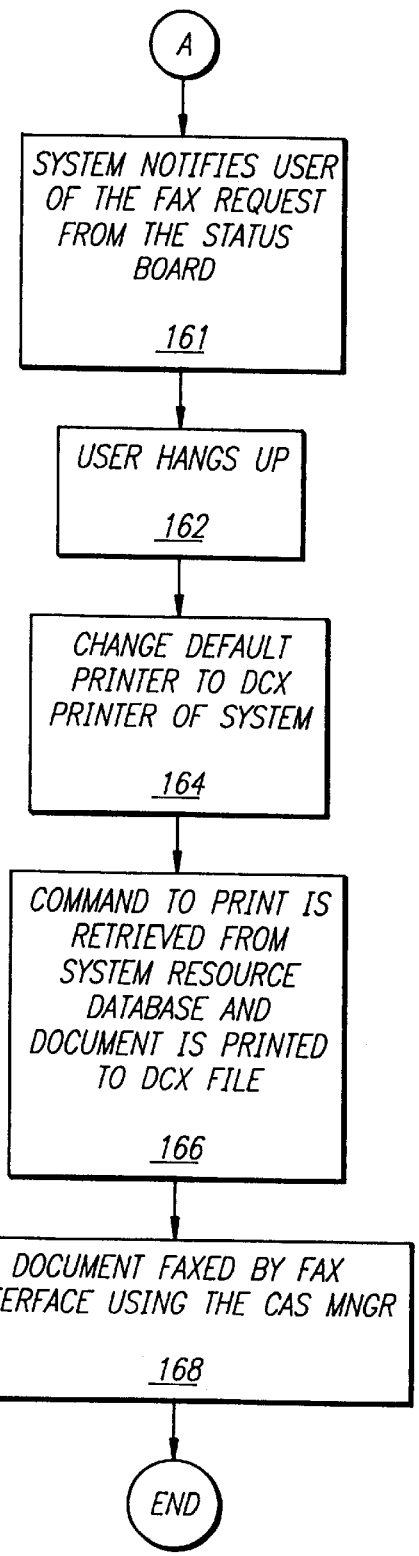
FIG. 6a
FIG. 6b

TELEPHONE ACCESS SYSTEM FOR ACCESSING A COMPUTER THROUGH A TELEPHONE HANDSET

This is a Continuation Application of application Ser. No. 08/594,333, abandoned filed Jan. 30, 1996 which is a Continuation Application of application Ser. No 08/385,193, now abandoned which was filed on Feb. 6, 1995 which is a Continuation Application of application Ser. No. 08/135,018 which was filed on Oct. 12, 1993, now abandoned.

BACKGROUND OF THE INVENTION

1. Field of the Invention

The present invention relates to a telephone access system which allows a user to interact with a computer through a telephone handset.

2. Description of Related Art

Computers may transmit, receive and display information through a variety of different communication devices. For example, personal computers may contain internal facsimile (FAX) boards and modem boards that allow the system to send and receive FAX's and electronic mail. The computer may also have digital, audio and speech to text capabilities which allow the system to store and generate recorded voice messages. These communication tools are in addition to the conventional system files, spreadsheets, etc.

Users presently interface with a personal computer through a screen and a keyboard. The interface may be supplemented by a "mouse" which allows the user to move the screen cursor to a graphic icon and select a function which corresponds to the icon. For example, to review the contents of a document, the user must first display the text on the screen, typically by providing a number of keyboard and/or mouse generated inputs. Once the document is displayed on the screen, the user can visually read the contents of the document. Communication through a FAX or electronic mail is also done by providing a number of keyboard/mouse inputs in accordance with instructions provided by software dedicated to the operation of the communication device.

Computers may contain vital messages, documents, schedules, etc. which must be reviewed by the user, even when the user is unable to operate the keyboard of the system. For example, the user may be traveling and have to review a document or look at a "calendar" program within a computer located in their office. Presently, the only way a user could review this information, is to have someone sit in front of the computer and operate the keyboard. It would be desirable to provide a system that allows the user to remotely access and interact with a personal computer.

SUMMARY OF THE INVENTION

The present invention is a telephone access system which provides remote access and communication with a computer through a telephone handset. The system provides audio instructions to the user to select between a plurality of audio dialogs. The audio dialogs may provide access to voice mail, electronic mail, a file manager (documents, databases, etc.) facsimiles and other data all stored within the computer. Once within an audio dialog, the system provides a series of instructions and controls which allow the user to manipulate the information stored within the computer. For example, the system may allow the user to listen to a message received through electronic mail and then reply to the message. The system may also allow the user to listen to the text of a document and FAX the document to a remote location. The system allows the user to communicate with a computer using a telephone to accomplish many of the same tasks currently performed with a keyboard and a screen.

The system is constructed so that a plurality of static functions are associated with a set of buttons on the telephone handset keypad. For example, depressing the * button will always cause the audio instruction provided by the system to be repeated to the user. The static buttons allow the user to become quickly assimilated with the system, so that the user can quickly scan through the different audio dialogs and control functions within the dialogs.

The system has an audio mechanism which merges prerecorded audio wave messages with stored audio text to speech messages so that instructions are provided to the user without any gap between the words of the audio wave message and the audio text to speech message. The audio mechanism can also provide audio background messages to audibly highlight a word or phrase that is graphically highlighted in the stored electronic text. The system also allows the user to scan a document and to provide the user with the spelling of a word within the document text.

The system provides an interface that contains building blocks which allow a programmer to customize the telephone access system. To debug each program, the system provides a keyboard/graphical interface which simulates a telephone handset. A graphical handset appears on a computer screen and is manipulated by a keyboard and/or mouse to enter input commands to the system that correlate to the depression of the telephone handset buttons.

It is therefore an object of the present invention to provide a system which allows a user to remotely access a computer through a telephone handset.

It is also an object of the present invention to provide a computer telephone access system which is easy to use by the operator of the system.

It is also an object of the present invention to provide a computer telephone access system which provides audio instructions to the user without creating gaps between prerecorded audio wave messages and audio messages that are converted to speech from electronic text.

It is also an object of the present invention to allow a user to review the text of a document stored in a computer through a remote telephone handset.

It is also an object of the present invention to audibly highlight words or phrases of a text that are graphically highlighted in the stored electronic text.

It is also an object of the present invention to allow a programmer to debug a computer telephone access system without using a telephone handset.

It is also an object of the present invention to remotely initiate the transmission of information by facsimile through a telephone handset.

BRIEF DESCRIPTION OF THE DRAWINGS

The objects and advantages of the present invention will become more readily apparent to those ordinarily skilled in the art after reviewing the following detailed description and accompanying drawings, wherein:

FIGS. 2a–c are a flowchart showing an interaction with a set of audio dialogs in a computer through a telephone handset;

FIGS. 6a–b are a flowchart showing the Faxing of a document by the FAX interface;

DETAILED DESCRIPTION OF THE INVENTION

Figure 1:
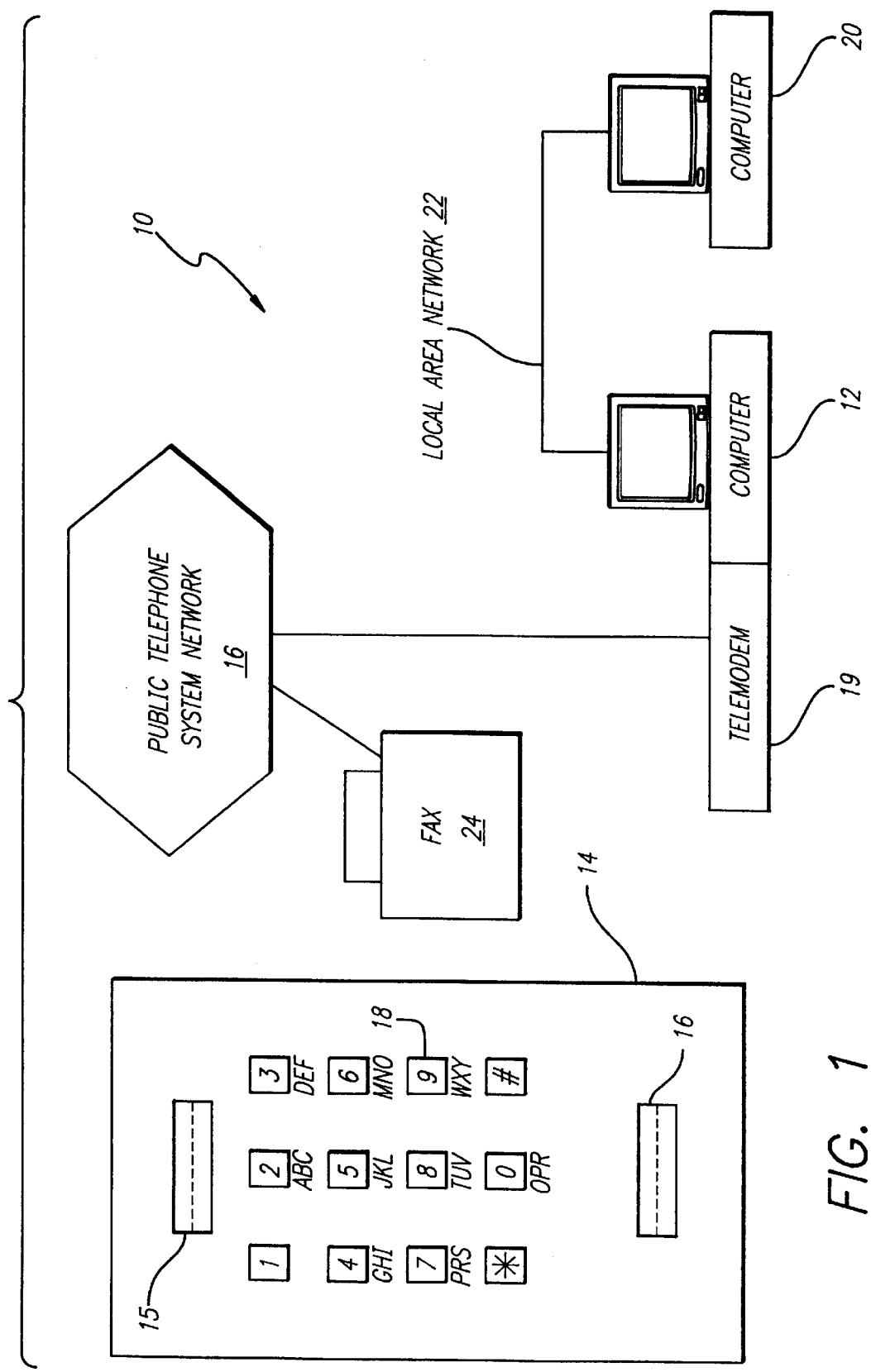
FIG. 1 is a schematic showing a computer telephone access system.

Referring to the drawings more particularly by reference numbers, FIG. 1 shows a telephone access system 10 of the present invention. The system 10 allows a user to access and interact with a computer through a telephone handset. The system contains a computer 12 that is coupled to a telephone handset 14 through a public telephone system network (PTSN) 16. The telephone handset 14 may be any conventional publicly available handset unit. The telephone handset 14 can be used in the system of the present invention without any additions or modifications to the unit. The handset typically contains a speaker 15, a microphone 16 and a keypad 18.

Conventional handset keypads contain 12 buttons that are associated with the roman numerals 0–9, along with a * button and a # button. The handset 14 may be coupled to the public telephone network 16 either by wires or in a wireless manner.

The computer 12 may be a personal desktop or laptop computer which is normally operated by the user. The computer 12 has an interface 19 that allows the computer to communicate with a PTSN or PBX system. In the preferred embodiment, the interface 19 is an internal telemodem card which can communicate through both modem and facsimile protocols.

The user's computer 12 may be linked to another computer 20 through a local area network (LAN) 22 by hardware and software well known in the art. The LAN system 22 allows the user to share information with the other computer 20, including electronic messages. The computer 12 can also be coupled to a facsimile (FAX) machine 24 through the PTSN 16. Although one FAX machine and a single additional computer 20 is shown, it is to be understood that the computer 12 can be coupled to a plurality of different computers and FAX machines.

Figures 2A, 2B:
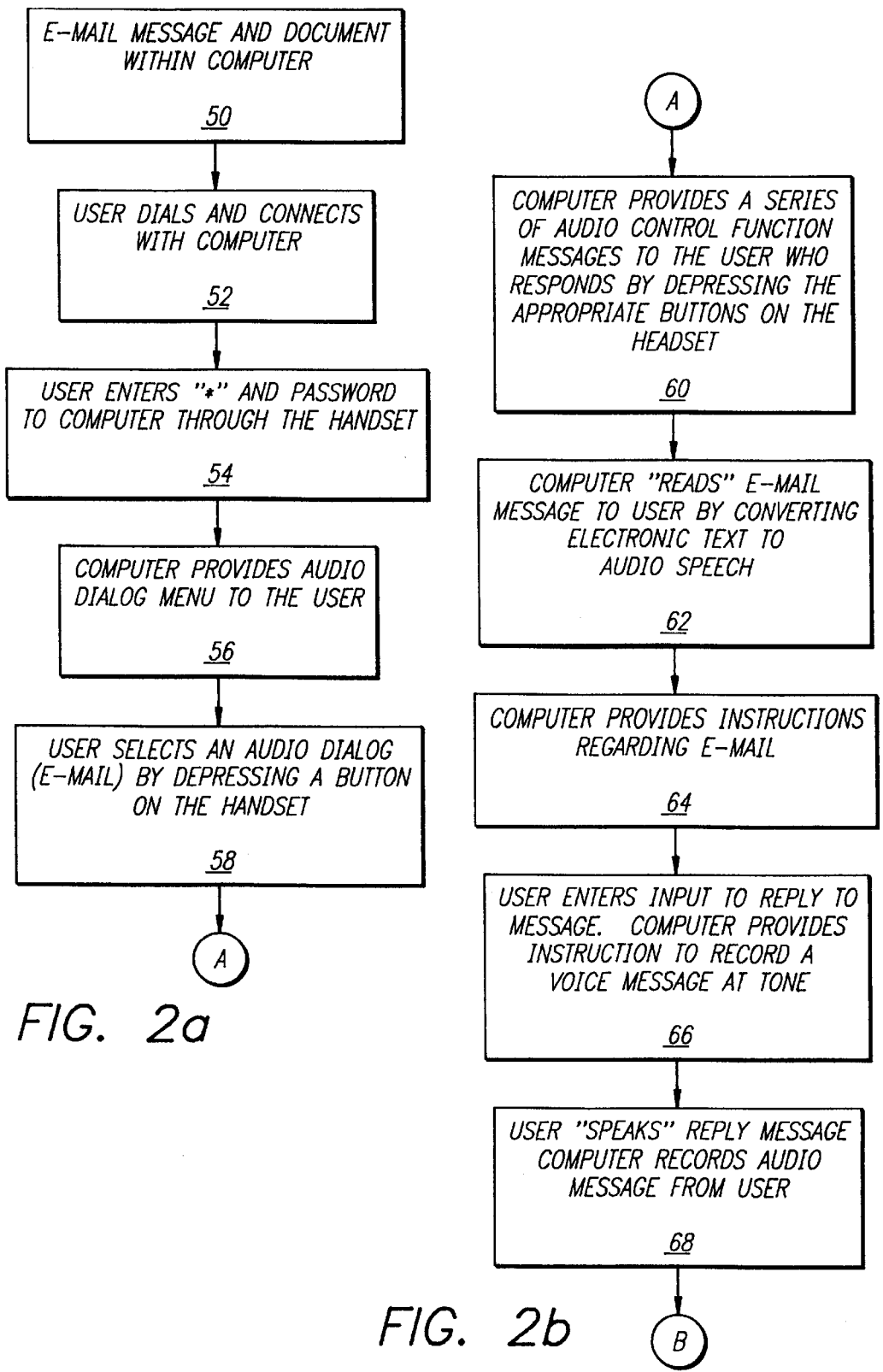

FIGS. 2a–c shows an exemplary communication between the user and the computer 12 through the handset 14. As shown in processing block 50, the computer 12 has received an electronic message from computer 20, along with a document that is to be reviewed by the user. In block 52 the user dials a phone number which is received and acknowledged by the computer 12. The computer answers the call and connects to the user. The user then presses the * button and enters a password through the keypad 20 of the handset 14 in processing block 54. The system is typically setup so that the user is allowed n number of chances to enter the correct password. For Example, the user may be given 3 chances to enter the correct password. If the user does not enter the correct password after n chances, the system locks out the user so that they cannot access the computer.

Once the correct password has been entered, the computer provides an audio dialog menu to the user along with instructions on how to select each audio dialog from the menu in block 56. For example, the audio message may state "To review a file press 1, to review your E-mail press 2, . . . ". Each dialog may have a summary to describe the contents of the dialog. For example, the audio message may state "Your E-mail has 5 messages, to review your E-mail message press 2".

The user selects an audio dialog (file, E-mail, FAX, voice mail, etc.) by pressing the appropriate button on the handset 14 in processing block 58. By way of example, the user may select to review E-mail by depressing the "2" button on the handset 14. In block 60, the computer 12 then provides the user with a series of audio control function instructions, which are responded to by the user by pressing the appropriate buttons. In block 62 the computer "reads" the E-mail message to the user by converting the electronic text to audio speech.

In block 64, the computer 12 may provide instructions on what to do with the E-mail after it has been "read" to the user. For example, the computer 12 may state "To save the message press 1, to FAX the message press 2, to reply to the message press 3 . . .". In block 66 the user presses 3, wherein the computer responds with an audio message to "Please record the message at the tone". The user's message is recorded in a digital format by the computer 12 in block 68. In block 70, the user presses "4" to send the reply message to computer 20, wherein the computer 12 transmits the recorded message to computer 20 through the LAN system 22.

After the recorded message is sent to computer 20, computer 12 again provides an audio message regarding the original E-mail message (eg. "To reply to the message press 1, to FAX the message press 2") in processing block 72. In block 74, the user presses 2 to FAX the message and document. In processing block 76, the computer 12 provides the user with an instruction asking for the phone number of the FAX machine. In block 78, the user enters the FAX number and hangs up. The computer 12 Faxes the message and document to the FAX machine in block 80.

The system 10 of the present invention allows a user to access and interact with a computer through a handset. As described above, the user can review messages, reply to messages and FAX documents all through a telephone handset. The above described communication between the user and the computer is merely illustrative of the system. The system is capable of providing many other features which will be described below.

Figure 3:
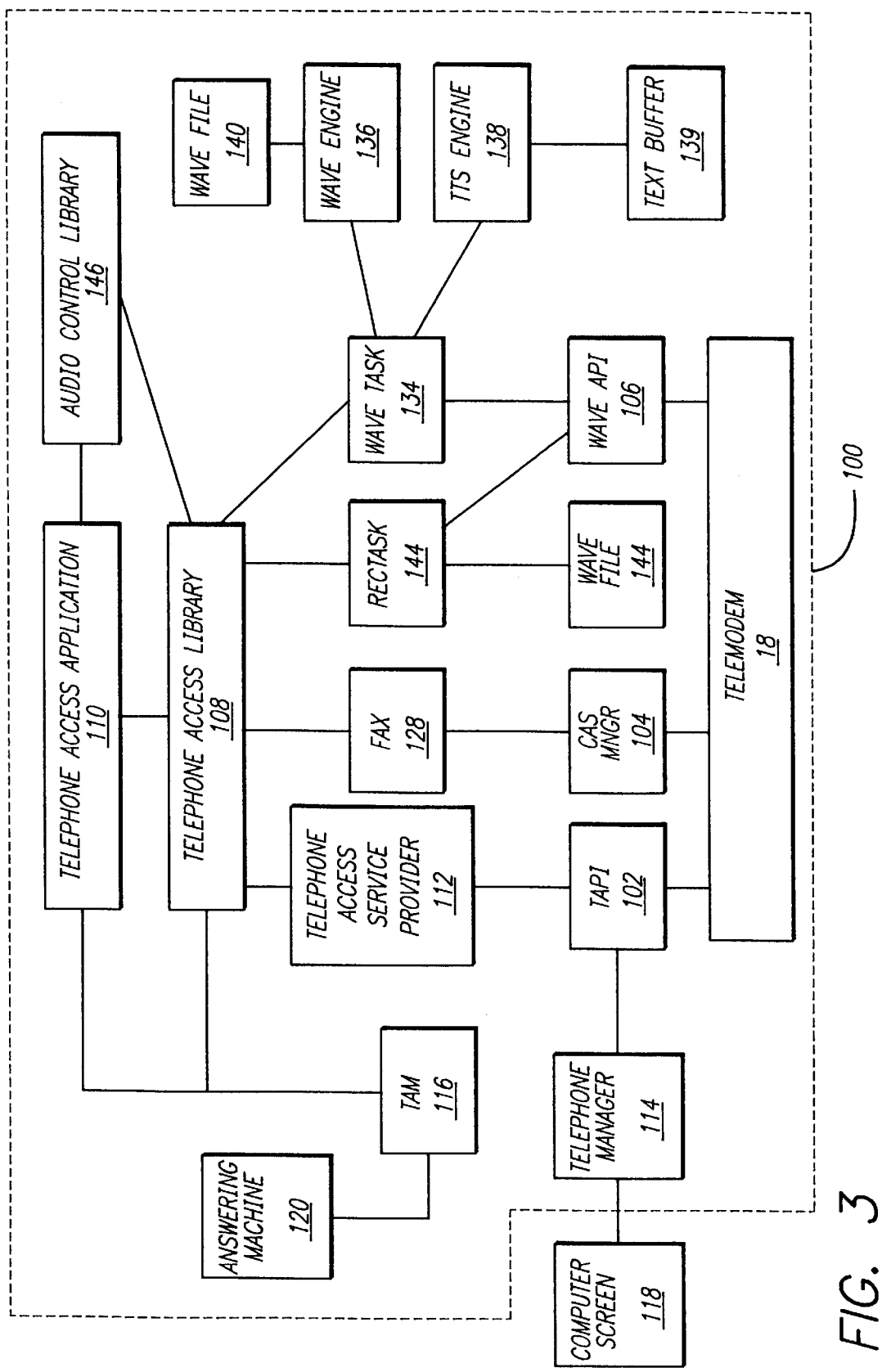
FIG. 3 is a schematic of the computer interface of the system.

FIG. 3 shows a computer interface 100 of the system. The interface 100 includes a telephone application programming interface (TAPI) 102 which allows the computer 12 to communicate with the PTSN 16. The TAPI 102 provides a means for the computer to answer, receive and control telephone calls from the PTSN. The TAPI 102 is found in Microsoft, Inc. WINDOWS operating system and is referred to as WINDOWS Telephony API. The interface 100 also has a communication application specification manager CAS MNGR 104 which provides a low level FAX interface with the PTSN 16. Such a program is presently marketed by Intel Corp. under the designation "DCA/Intel Communicating Application Specification" and provided with FAX hardware sold by Intel under the trademark "SatisFaxtion". Although the CAS MNGR 104 is shown and described, it is to be understood that other low level FAX interfaces can be used in the present invention.

The computer system interface also has a wave application program interface (WAPI) 106 which converts digital audio signals from analog audio signals and analog audio signals to digital audio signals. Such an interface is presently within the WINDOWS operating system and is referred to as the WAVEFORM API.

The system has a telephone access library (TAL) 108 coupled to the TAPI 102, WAPI 106 and CAS MNGR 104. The TAL 108 is coupled to telephone access applications 110 through a telephone access manager (TAM) 116. The telephone access applications 110 are programs that are modified to run in accordance with inputs from a telephone handset. For example, the telephone access applications may provide access to Microsoft windows based applications such as an address and calendar program sold as PACKRAT, a file manager such as WINDOWS FILE MANAGER, or a FAX program such as FAXability. These programs are presently accessed through the screen and keyboard/mouse of the computer. The telephone access applications are installed and configured in the telephone access manager.

The system of the present invention allows the applications developer to modify the program to allow communication through a telephone system. These modified applications will be referred to as tapplets. By accessing a tapplet, the user can communicate with one of the applications within the computer through the telephone handset. For example, the user may access a tapplet that provides a link to an electronic mail program. Once linked with the E-mail tapplet, the user can "review" the contents of the E-mail. Another tapplet may provide a link to a file manager, wherein the user can access a file within the computer. Communications between the user and a tapplet will be referred to as an audio dialog.

The TAL 108 provides an interface which responds to inputs from the access application 110 or the user and conducts the necessary task required to carry out the program. More specifically, the TAL provides the tapplet with high level services that include telephony, audio waveform, text to speech and FAX. The TAL provides a plurality of basic primitives which allows the programmer to author a tapplet. For example, a tapplet for an answering machine could be written with the following abstractions.

WaitForCall;

AnswerCall;

PlayWave greeting.wav;

Record message.wav;

In this example, the tapplet provides an input to the TAL to wait for and answer a call. When a call is answered, the TAL will then provide instructions to the WAPI to generate an audio message to the user that is stored in the file "greeting .wav", correlating to the "PlayWave greeting-.wav;" instruction from the tapplet. The TAL also provides the mechanism for recording the audio message from the user. The inputs from the telephone handset are converted to a digital format by the TAPI and provided to the TAL as a program input.

The TAL can handle asynchronous functions that are hidden from the tapplet. For example, the user may enter digits before the application reaches a step in the audio dialog that request the digits. The TAL will store the digits in an input queue. When the tapplet explicitly request an input, the TAL can provide the contents of the input queue. If the input queue is not full, the tapplet can go to "sleep" until the queue is full with the entered digits. The TAL also provides a means for controlling the system output through the input received from the telephone handset. For example, the TAL allows an output to be skipped without sequentially providing each instruction of the output to the user. In the above example, the tapplet may require a series of instructions starting with "to access E-mail press 1" and then provide the instruction "to access FAX press 2" and so forth and so on. If the user enters 2 after the instruction for E-mail, the TAL will interrupt the routine to jump to the FAX dialog without playing the instruction "to access FAX a press 2".

Referring to FIG. 3, the TAL 108 is coupled to the TAPI 102 through a dynamic link library referred to as a telephone access service provider 112. The TAPI 102 is also connected to a telephone manager 114. The telephone manager 114 receives incoming phone calls and displays the calls onto the screen of the computer.

When the computer receives an incoming call the TAPI first determines whether the call is a voice, a facsimile or a modem data transfer. If the call is voice, the TAPI 102 will provide the telephone manager 114 with a new call message. The call is then displayed to the computer screen. If the user is at the computer 12 and answers the call, the system assumes a conventional voice communication mode, wherein the user communicates with the other party through the PTSN. If the user does not pick up the phone after a predetermined number of rings, the telephone manager tags the call as a stored voice message and hands the call to the TAPI 102, which relays the stored voice message to the TAM 116 via the telephone access provider 112.

The TAM 116 may be coupled to an answering machine 120, that provides an audio message such as "Please record a message at the tone". Before the termination of the answering machine routine, the user may provide an input, such as depressing the * button of the telephone handset 14. Upon receiving the * input the TAM 116 requests a password from the user. The TAM 116 then receives and verifies the subsequent password entered by the user. If the user does not enter the * input or provide a correct password, the TAM 116 will hang up the call. If the user does not attempt to enter a password, the answering machine will record any subsequent voice message provided by the user.

The incoming call is forwarded to the service provider 112 by the TAPI 102. The system is capable of servicing a number of different incoming calls. To track the different calls, the service provider 112 tags each call with a particular call ID for future use by the TAL 108. For example, the TAL may establish a number of different input queues for each call. The inputs from each caller is then entered into each corresponding input queue for subsequent use by the tapplets.

Figure 4:
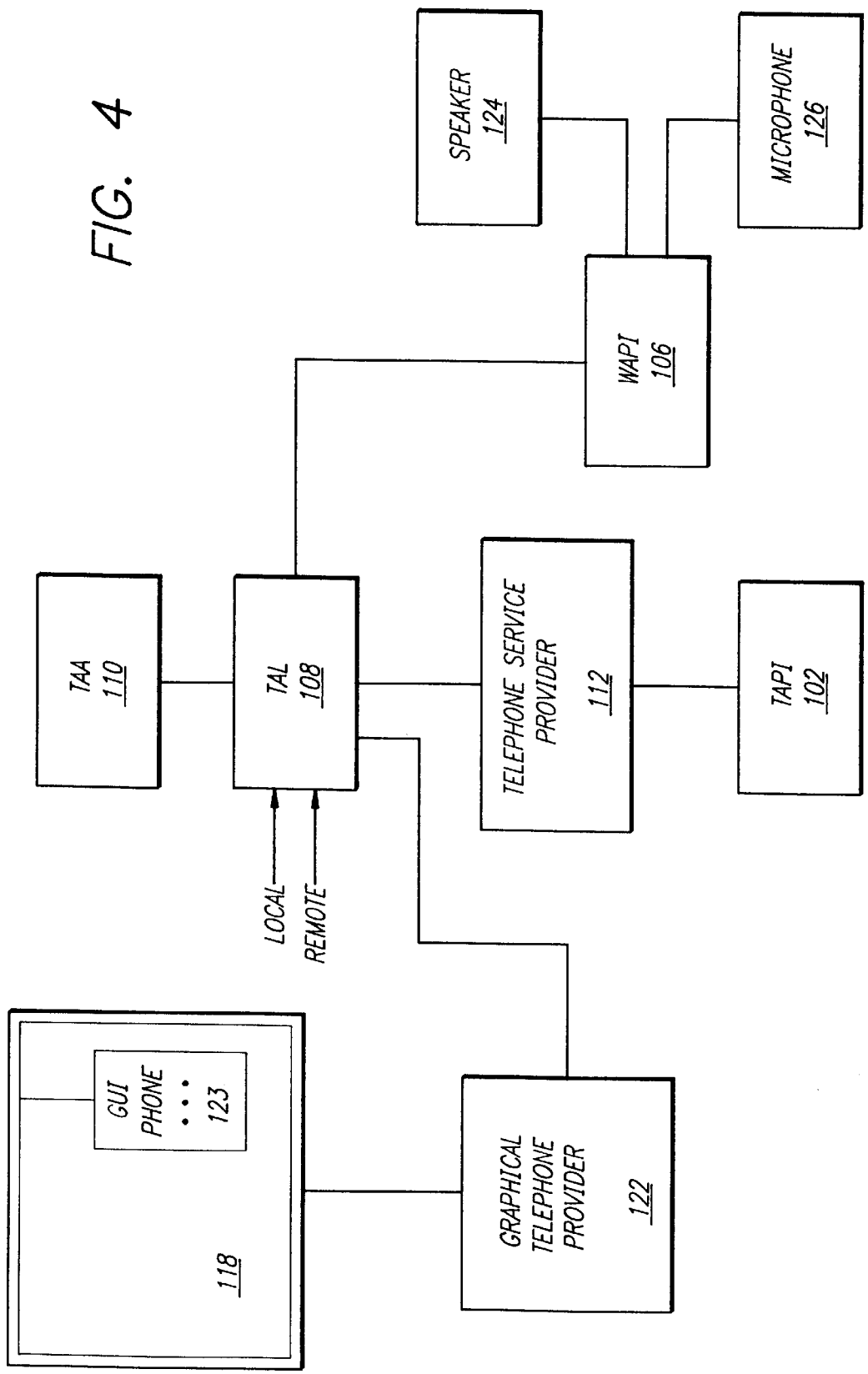
FIG. 4 is a schematic of a system for graphically debugging an application of the system.

As shown in FIG. 4, the system may include a graphical telephone provider 122 that is coupled to a graphical user interface (GUI) phone 123 that is displayed on the screen 118 of the computer. The graphical telephone provider 122 simulates a telephone and allows the user to select a handset button through the keyboard/mouse of the computer.

In operation, the GUI 123 creates "new call" button on the computer screen 118. The programmer then enters the "new call" function through the computer keyboard/mouse interface. The graphical telephone provider 122 establishes a phone connection with the system by sending notification of a new call to the TAL 108 in the same manner that the TAPI 102 would notify the TAL of a new call provided by the PTSN. The graphical provider then creates a simulated handset on the screen. The user can then select a keypad button through the keyboard/mouse interface. Upon the selection of a button, the graphical provider 122 provides the appropriate verification to the system that correspond to the selected button.

The TAL will preferably contain an input which can be toggled between "local" and "remote", wherein the system operates through the PTSN when in the remote mode and through the graphical telephone provider when in the local mode. The graphical telephone provider 122 is connected to a speaker 124, through the WAPI 106, which allows the user to hear the audio messages generated by the computer. In the "local" mode, the graphical telephone provider 122 insures that the local wave devices are coupled to the speaker 124 and microphone 126. The telephone provider 122 may also be coupled to a microphone 126 and provides an input device that allows the user to record messages in the system. The graphical provider 122, speaker 124 and microphone 126 together simulate the operation of a telephone handset and allows a programmer to debug a tapplet without physically connecting the system to a public telephone network.

Figure 5:
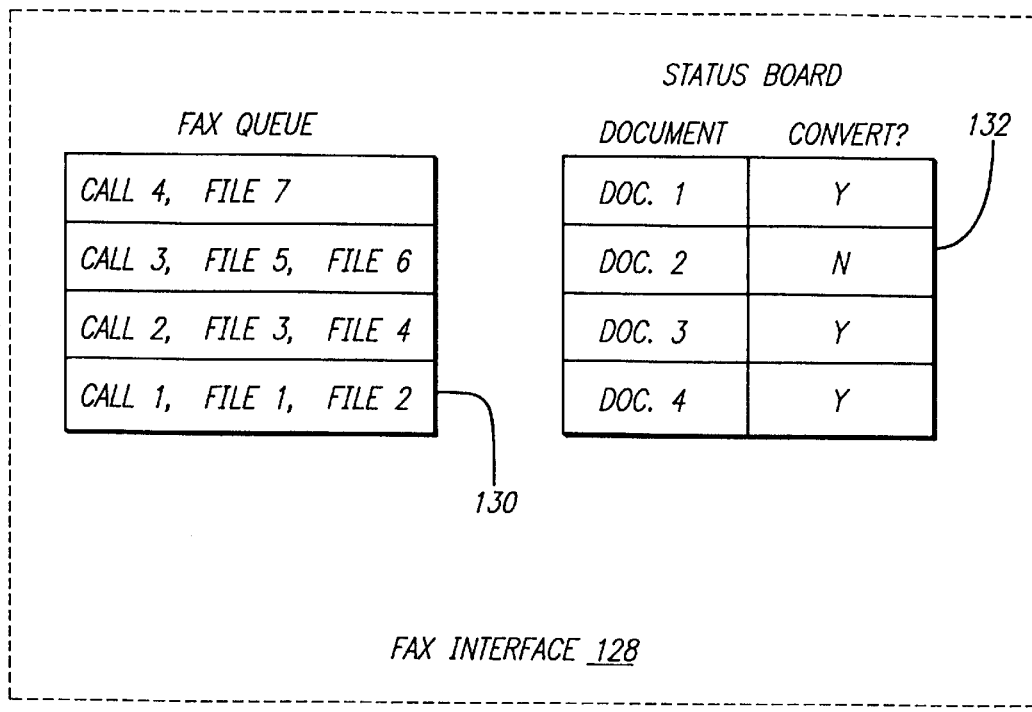
FIG. 5 is a schematic of an interface that allows facsimile transmission of information from the computer through a telephone handset.

Referring to FIG. 3, the TAL 108 includes a FAX interface 128 which can send information from the computer over the PTSN by facsimile in response to input from the telephone handset. FIG. 5 shows the FAX interface 128 which provides three primary tasks; collecting files, rendering files and sending files after the user hangs-up the telephone. To accomplish these task the TAL includes a FAX queue 130 and a status board 132. The FAX queue 130 stores FAX request from the user(s) as they are received and Faxes the information on a first in first out (FIFO) basis. Each requested document is tagged with a corresponding FAX phone number that was entered by the user. The status board 132 list all of the requested files and then determines whether the documents can be converted into the FAX protocol. If the system cannot convert the document into a FAX protocol, the computer provides the user with an audio message indicating that the document cannot be converted.

FIG. 6 shows the transmission of a document by facsimile through the handset. The user initially accesses the system and enters a request to FAX several documents in processing block 150. The system retrieves the documents in block 152. In decision block 154, the FAX interface 128 then determines whether the document can be converted to the FAX protocol with the system software. If the system cannot convert the document, the FAX interface 128 places a "N" in the status board in block 156.

If the document can be converted the document is placed in the FAX queue in processing block 158. The FAX interface 128 then proceeds to see if there is another document to be converted in decision block 160. After all the documents are reviewed, the system notifies the user of the FAX request from the status board in block 161. In block 162 the user hangs up the telephone handset.

If the system can convert the document, the document is rendered. The requested documents can be rendered by first changing the default printer of the computer to the DCX printer in block 164. In processing block 166, the TAL goes to the resource database of the computer operating system to find the command to print and "prints" the document to the "DCX printer port" file. In block 168, the document is Faxed by the FAX interface 128 using the CAS MNG 104.

As an alternate embodiment, instead of having the TAL go to the resource database to retrieve the print command and then issue the command, the system may include a universal document viewer application such as the application marketed by Systems Compatibility Corp. under the trademark OUTSIDE IN, which can view any type of document. Under the alternate approach, the default printer is changed to the DCX printer and then the TAL request the OUTSIDE IN program to print the document to the DCX printer, where the document is converted and then submitted to the telemodem board.

Referring to FIG. 3, the TAL has a play wavetask interface 134 which is used to generate audio messages. The wavetask is connected to a wave engine 136 and a text to speech (TTS) engine 138. The TTS engine 138 may be a program marketed by First Byte under the trademark PROVOICE, which converts electronic text into a format which can be converted into audio messages. The TTS engine 138 is connected to a text buffer 139. The wave engine 136 is coupled to any number of pre-recorded wave files 140 that contain digitized pre-recorded audio messages. The wave file is typically located on the hard disk drive of the computer.

The present invention provides both wave and text to speech audio generation, which each have advantages that can be utilized by the programmer. For example, wave generation has excellent sound quality and no delay time in generating the output, but has a limited pre-recorded vocabulary and requires a large amount of memory. Text to speech has a large vocabulary and requires relatively little storage, but has poor sound quality and possibly a large delay time to create the speech.

The wavetask interface 134 requests and receives buffers of data from the engines in accordance with instructions from the TAL 108. The wavetask 134 then provides the data buffers to the WAPI 106, which transmits the data to the handset 14 through the telemodem card 18. The wavetask interface 134 preferably has two buffers (not shown), which typically alternate between transmitting data buffers to the WAPI 106, wherein one buffer is receiving data buffers from an engine while the other buffer is transmitting data buffers to the WAPI 106.

When the TAL 108 receives a generate speech input from the TAA 110 (i.e. a tapplet), the TAL queues up the contents of the speech input commands. For example, the tapplet may contain the following program:

Playwave X.wave;

PlayTTS "5";

Playwave Y.wave;

which correlates to the audio message "You have 5 messages". Upon receipt of the input, the TAL queues each step within a global queue and instructs the wavetask to initiate speech in accordance with the command in the first queue "Playwave X.wave". The wavetask 134 then provides an "initiatewave" command to the wave engine 136 to generate buffers from the X.wave file, within a set number of buffers and with a predetermined ID of a wave driver device. The wave engine 136 retrieves the X.wave file from the wave file 140. When the wavetask 134 is ready to receive the buffers, the interface 134 generates a "RequestWaveBuffer" command to the wave engine 136. The wave engine then provides the data buffers to the wavetask 134. The data buffers each have an engine header which identifies which engine is generating the buffer (wave or TTS) and a buffer header which identifies weight of the buffer within the buffer stream (first buffer, last buffer, etc.).

At the start of each speech generation request, two "RequestSpeechBuffer" (for the TTS engine 138) or two "RequestWaveBuffer" (for the Wave engine 136) instructions are provided to fill both buffers within the wavetask interface. After the buffers are initially filled and one of the buffers is transmitted and returned from the WAPI 106, the interface 134 provides a "RequestSpeechBuffer" command (if required) and a "ReturnSpeechBuffer" command for the TTS engine 138, or corresponding "RequestWaveBuffer" and "ReturnWaveBuffer" commands for the wave engine 136. The data buffers that had been played by WAPI 106 are returned to the wave engine 136 by wavetask 134 along with the "ReturnSpeechBufer" instruction. The wave engine 136 then returns the data buffer for reuse by the system.

The buffers must be allocated using WINDOWS GlobalAloc and locked with GlobalLock. When the buffers are returned to the wavetask from the WAPI, the buffers are unlocked using WINDOWS GlobalUnlock and freed using GlobalFree. The Global memory allocation is also used for the engine and buffer headers.

Upon receipt of the last data buffer from the wave engine for the command "Playwave X. wave;", and before the last data buffer is submitted to WAPI 106, the wavetask interface 134 provides an "InitiateSpeech" command to the TTS engine 138 to generate data buffers for the audio message "5". The TTS engine 138 then converts the text to audio and provides the buffers to the wavetask 134 in response to a "RequestSpeechBuffer" request from the interface 134. When the last data buffer is received from the TTS engine 138, the wavetask interface 134 initiates the wave engine 136 for the command "Playwave Y.wave;". Initiating the next engine before the last data buffer is submitted to WAPI eliminates any gaps in the audio message, thereby providing a sound that is more realistic.

The generation of speech from the engines is terminated by a "TerminateSpeech" command from the wavetask 134. The engines immediately stop sending data buffers to the wavetask upon receipt of the "Terminate Speech" command. This feature allows the user to skip through the audio message without hearing the whole message. For example, the user may provide a handset input to skip the message after the WAPI has generated the audio message "You . . . ", wherein the wavetask provides a "TerminateSpeech" instruction to the TTS engine 138 or "TerminateWave" instruction to the Wave engine 136, to terminate the transmission of data buffers. The "Terminatespeech" and/or "TerminateWave" commands are generated in response to an input from the TAL which receives the user's handset input through the TAPI 102. The entire session is closed when the wavetask interface 134 provides a "ShutdownSpeech" and "ShutdownWave" commands to the engines 136 and 138. The interface 100 also has a record wavetask interface that is connected to a wave engine and allows audio messages from the user to be digitally recorded by the computer.

The wave engines have certain speech parameters which can be accessed through the WAVEHDR structure of each buffer. These parameters include an engine header for each buffer. The engine header may include a dwKind field which specifies the type of engines. This parameter may be expanded to add another engine. The engine header also includes a dwFlag field which provides flags for the first, middle and last data buffers. The header may also include a dwuser field to be defined by the programmer and a dwReserved field. Table I list additional controllable speech parameters provided by the system.

TABLE I

SP_NUM_VOICES
    Specifies the number of supported voices.
SP_CURRENT_VOICE
    Specifies the current voice number.
SP_DEFAULT_VOICE
    Specifies the default voice number.

TABLE I-continued

SP_MIN_RATE
    Specifies the minimum speaking rate in WPM.
SP_CURRENT_RATE
    Specifies the current speaking rate in WPM.
SP_DEFAULT_RATE
    Specifies the default speaking rate in WPM.
SP_MAX_RATE
    Specifies the maximum speaking rate in WPM.
SP_MIN_PITCH
    Specifies the default minimum pitch of the synthesized speech.
SP_CURRENT_PITCH
    Specifies the current average pitch of the synthesized speech.
SP_DEFAULT_PITCH
    Specifies the default average pitch of the synthesized speech.
SP_MAX_PITCH
    Specifies the maximum average pitch of the synthesized speech.
SP_11K8
    Specifies the speech engine supports 11.025K 8 bit waveforms.
SP_11K16
    Specifies the speech engine supports 11.025K 16 bit waveforms.
SP_8K8
    Specifies the speech engine supports 8K 8 bit waveforms.
SP_8K16
    Specifies the speech engine supports 8K 16 bit waveforms.

The TTS engine may also provide in-text commands which vary the context of the audio message. For example, the in-text command may vary the pitch of the sound generated, or may insert a window of silence before the generation of the next word.

Graphical text will typically have highlights such as underlining or bold print. It is desirable to provide an audio indication of such highlights to the user. The system of the present invention provides such highlights by mixing an audio background with the spoken word. For example, a musical chime could be generated with a spoken word generated from the TTS engine. To create an audio highlight, the tapplet program could be written as follows:

Playwave X.wave;
    Play TTS "5", Z.wave;
    Playwave Y.wave;

To audibly highlight the number "5", the wavetask interface 134 would provide an "InitiateSpeech" command to the TTS engine 138 and an "InitiateWave" command to the wave engine 136 to retrieve the text "5" and the Z.wave, respectively. The wavetask 134 provides buffer request to the engines to receive data buffers from the engines. The wavetask 134 alternately mixes the buffers so that the WAPI 106 receives a mixed data buffer from the wave engine 136. The wavetask 134 mixes the buffers by adding a first unit from the buffer of the wave engine 136 with to a first unit of the TTS engine 138, and adding a second unit of the TTS engine 138 to the second unit of the wave engine 136, and so forth and so on. The wavetask thus mixes the buffers so that the background sound is being generated simultaneously with the spoken word.

Referring to FIG. 3, the system also has a RecTask interface 142 which receives recorded buffers from the Wave API 106 and writes to a wave file 144.

Figure 7:
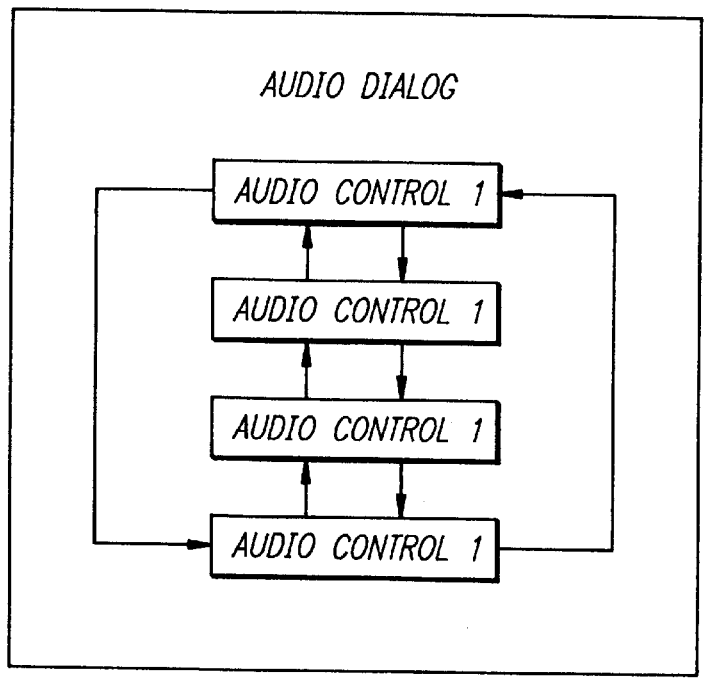
FIG. 7 is a schematic showing an audio dialog which has a plurality of audio controls.

A tapplet may have a plurality of different audio dialog. As shown in FIG. 7, each dialog typically contains a number of audio controls. The audio controls provide the user with a combination of input, output and/or control functions. For example, the audio dialog may be a communication with a file manager. After the user selects the file manager dialog, the first audio control message from the computer may state "To review directory A press 1, to review directory B press 2. . . ". The user may select 2 (directory B), the next audio control message may state "To review file X press 1, to review file Y press 2 . . . ".

Referring to FIG. 3, the system has an audio control library (ACL) 146. The ACL 146 provides the programmer of the access applications a number of audio control abstractions. Table II provides a number of different audio controls provided by the system.

TABLE II

| AUDIO CONTROL | PURPOSE |
| --- | --- |
| Slider | Adjust a parameter such as speed or volume. |
| Selector | Select an item from a skip and scan list. |
| Menu | Invoke one of several functions from a voice menu. |
| Wave capture | Make a digital recording. |
| Digit capture | Capture a string of digits. |
| Alphanumeric capture | Capture an alphanumeric string. |
| Wave Reader | Play a digital recording. |
| Text Reader | Present text using a voice synthesizer. |
| Display | Present a label, title, or instructions. |

Figure 8:
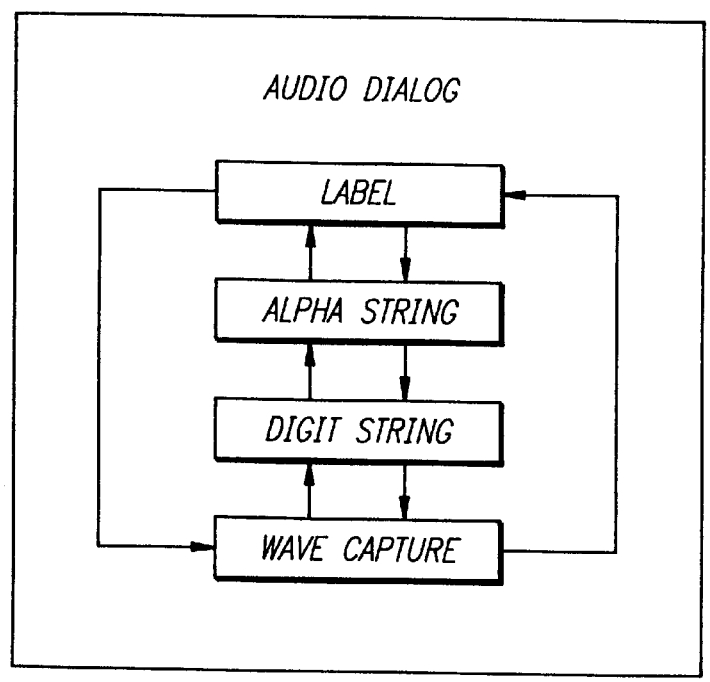
FIG. 8 is a schematic similar to FIG. 7 showing an audio dialog with a number of different audio controls.

FIG. 8 provides an example of a dialog with different audio controls. The first control may identify the audio dialog. The second audio control may request an alphanumeric string. For example, the audio message may state "Please enter your file name at the tone". The third audio control may be a request to enter a digit string. The last audio control message may be a request to leave a voice message.

Figure 9:
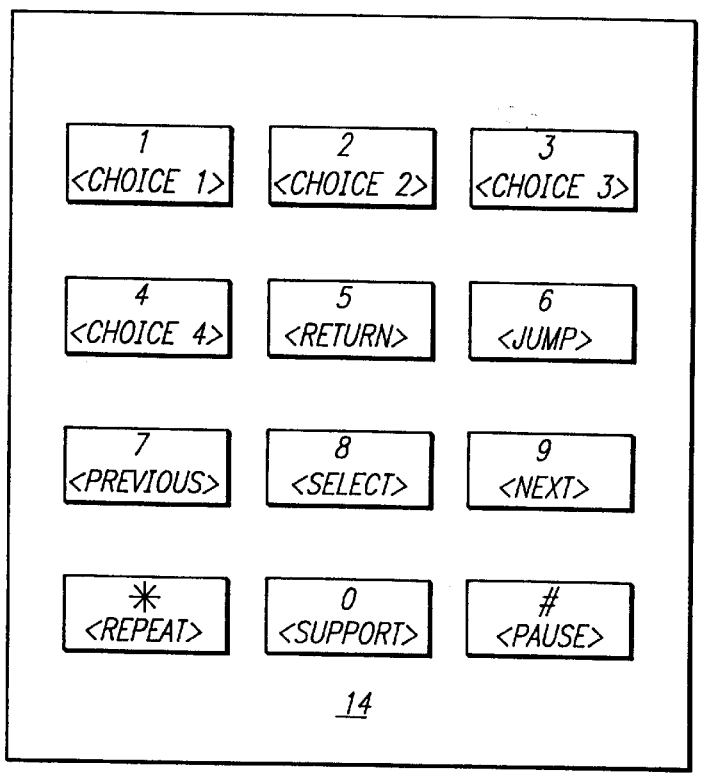
FIG. 9 is a schematic of a telephone handset with assigned functions.

FIG. 9 shows a preferred telephone keypad of the present invention. The numerals 1–4 are assigned dynamic functions, while the numerals 0, 5–9, along with the * and # buttons are assigned static functions. The buttons 1–4 may provide any type of function in accordance with the commands of the audio controls. For example, in a file manager audio dialog, the button 1 may FAX a file while in one audio control and "save" a file in a subsequent audio control. Likewise, the number 2 may delete a file in the first audio control and FAX the file in the subsequent audio control.

The static buttons 0, 5–9, * and # have the same function for all dialogs and all audio controls. In the preferred embodiment, the numeral 5 has a "return" function, which moves the user into the previous audio dialog. The numeral 6 is dedicated to a jump function. When numeral 6 is selected, the user is provided with a voice menu that has four different options. Option 1, allows the user to jump forward a predetermined number of items within the audio dialog. Option 2 will allow the user to jump backward a predetermined number of items. Neither option 1 or 2 will allow the user to jump out of the audio dialog. Option 3 will jump the user to the beginning of the tapplet. Option 4 will jump the user to the TAM so that the user may select another tapplet. The jump function allows the user to quickly move to the audio control of interest or rapidly exit the audio control.

The numeral 7 on the handset is dedicated to a "previous" function which always moves the user to the preceding audio control. The "previous" function has a wrap around feature which moves the user to the last audio control within an audio dialog if the user is presently at the first audio control. The numeral 8 is associated with a "select" function which allows the user to move to another audio dialog. The numeral 9 is dedicated to a "next" function which allows the user to move to the next audio control. Like the "previous" function, the next function also has a wrap around feature.

The * button is dedicated to a "repeat" function which repeats the most recent audio message from the computer. The # button allows the user to "pause" and resume the audio dialog. To pause the dialog, the user selects the # button. The user then depresses any button to resume the dialog. The numeral 0 is dedicated to a support function. The support function provides three options. Option 1 provides a help feature to help the user with the audio dialog. Option 2 allows the user to set parameters within the tapplet. Option 3 allows the user to set general system parameters. Table III provides a listing of parameters that can be set through the support function.

TABLE III

| Parameter | Purpose and current value passages | Audio Control |
| --- | --- | --- |
| Speed | Speed is 180 words per minute | Slider |
| Volume | Volume is 3 decibels. | Slider |
| Delay Time | The delay time before repeating announcements is 5 seconds. | Slider |
| Police scan option (automatic <next> after each announcement) | The police scan option is enabled (disabled). | Selector |
| Present standard commands passage | The standard commands are [NOT] presented. | Selector |
| Sound cues | Sound cues are [NOT] presented. | Selector |
| Password | Current password is dddddd | Digit Capture |
| Confirmation | Changes are confirmed by user. | Selector |
| National language choice | You prefer English (De vil helst Norsk, Sie vollen Deutsch, Parle Italiano, . . . ] | List of selectors (skip and scan list) |

The slider controls and allows the user to either increase or decrease a parameter. For example, the slider audio control may state "The current speech speed is 180 words per minute, to increase the speed 10 words per minute press 3, to decrease the speed 10 words per minute press 1".

The combination of static and dynamic functions allows the user to easily navigate through the audio dialogs of the system. Associating certain keypad buttons with static functions allows the use to quickly become familiar with the static functions. The static functions allow a user who already knows the audio dialog to move to the audio control of interest without hearing all of the messages.

Alphanumeric strings can be entered with either a single tone or two-tone entry. In a two-tone scheme, two button entries are provided for each numeral or letter entered. Table IV provides a listing of the combination of entries and the encoded numerals, letters, etc. associated with the entries.

TABLE IV

| ALPHA-NUMERIC TO BE ENTERED | USER PRESSES THREE KEYS ON THE TELEPHONE KEYPAD |
|---|---|
| 1 | 1-0 |
| 2 | 2-0 |
| 3 | 3-0 |
| 4 | 4-0 |
| 5 | 5-0 |
| 6 | 6-0 |
| 7 | 7-0 |
| 8 | 8-0 |
| 9 | 9-0 |
| 0 | 0-0 |
| A | 2-one of (1,4,7) |
| B | 2-one of (1,5,8) |
| C | 2-one of (3,6,9) |
| D | 3-one of (1,4,7) |
| E | 3-one of (2,5,8) |
| F | 3-one of (3,6,9) |
| G | 4-one of (1,4,7) |
| H | 4-one of (2,5,8) |
| I | 4-one of (3,6,9) |
| J | 5-one of (1,4,7) |
| K | 5-one of (2,5,8) |
| L | 5-one of (3,6,9) |
| M | 6-one of (1,4,7) |
| N | 6-one of (2,5,8) |
| O | 6-one of (3,6,9) |
| P | 7-one of (1,4,7) |
| Q | 1-one of (1,4,7) |
| R | 7-one of (2,5,8) |
| S | 7-one of (3,6,9) |
| T | 8-one of (1,4,7) |
| U | 8-one of (2,5,8) |
| V | 8-one of (3,6,9) |
| W | 9-one of (1,4,7) |
| X | 9-one of (2,5,8) |
| Y | 9-one of (3,6,9) |
| Z | 1-one of (2,5,8) |
| (space) | 1-one of (3,6,9) |
| (wild card) | ** |
| (erase everything entered so far) | *0 |
| (backspace: erase previously entered character) | *-one of (1,4,7) |
| (reserved for future use) | *-one of (2,5,8) |
| (reserved for future use) | *-one of (3,6,9) |
| [reserved for future use] | *# |
| (terminate and return) | # |
| .(period) | 0-one of (1,4,7) |
| -(hyphen) | 0-one of (2,5,8) |
| _(underline) | 0-one of (3,6,9) |

For example, the audio control may state "Please enter the file name". To enter the file name Doe, the user would push the 3 button and then either the 1, 4 or 7 button to enter the letter D, the 6 button and then either 3, 6 or 9 to enter the letter O and so forth and so on.

In a single tone scheme, the user pushes the button associated with the letter. As shown in FIG. 1, each button of a telephone handset 14 has associated letters. The numeral 2 is associated with the letter A, B and C. The numeral 3 is associated with the letters D, E and F, and so forth and so on. When the user has entered an alphanumeric string, the computer audibly presents the user with the most likely words. For example, if the user pushes the buttons 3-6-3, the computer will then provide the user with the option of DOE or FOE. The user can skip and scan through the options and select the desired alphabetic string. The user may backspace one alphanumeric by entering *1, *4 or *7 and erase the current contents by pressing *0.

The system has audio dialogs to record and replay audio messages. The wave capture dialog allows for the recording of audio messages from the user Recording begins when the user presses the select button. The message may be erased by pressing the *0 buttons. The wave reader controls present options which allow the user to review audio messages, and also fast forward and rewind the messages.

Figure 11:
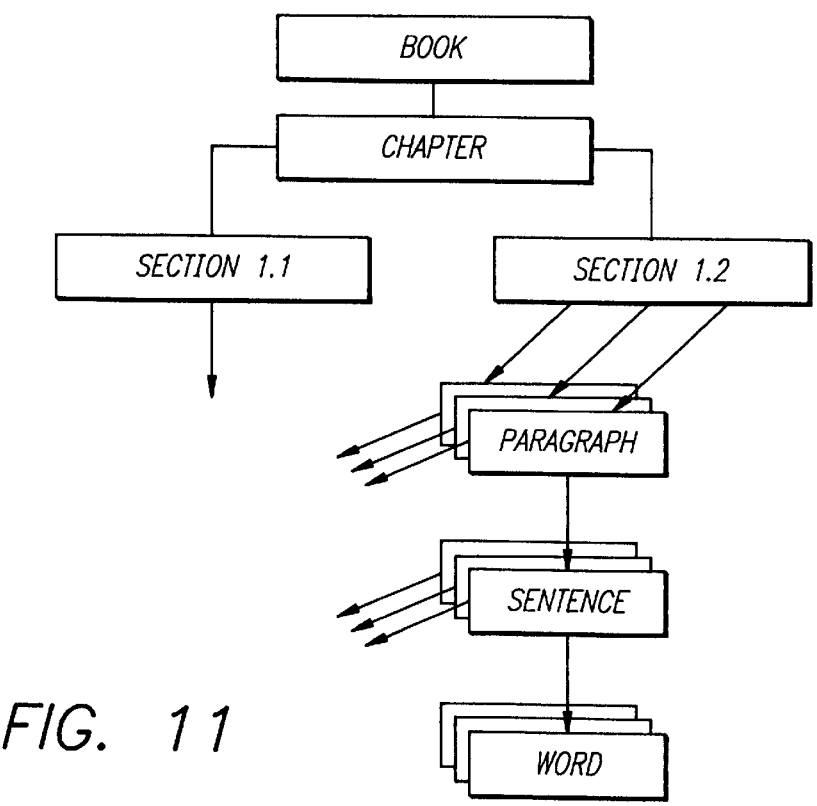
FIG. 11 is a schematic of a text review hierarchy.
Figure 10:
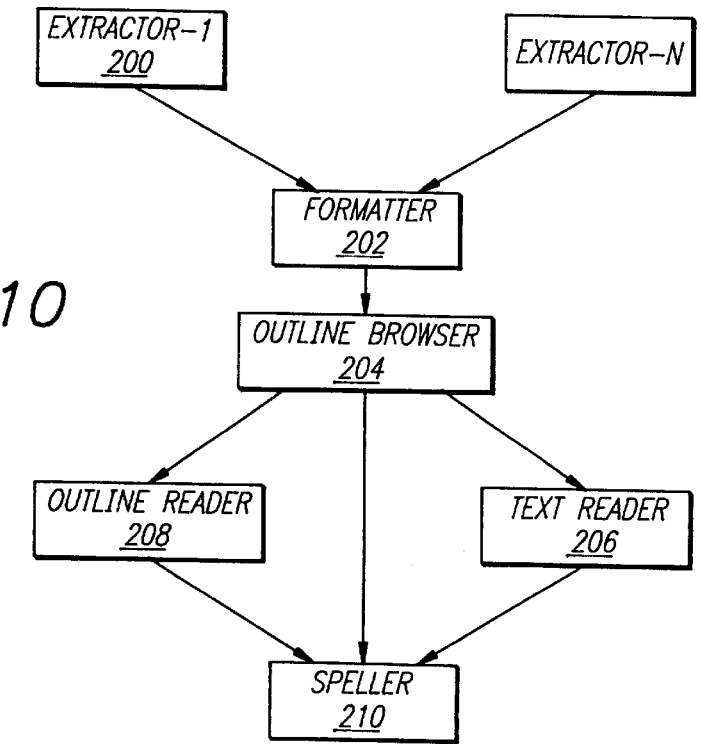
FIG. 10 is a schematic showing modes which allow a user to review the text of a document through a telephone handset.

Electronically stored text such as a document or an electronic mail message may be structured by the system within a hierarchy by the modes shown schematically in FIG. 10. The system has an extractor 200 which extracts text from a document. The formatter 202 then creates a hierarchy of the text and provides tags for each different object within the hierarchy. FIG. 11 provides an example of a hierarchy created for a book. The formatter 202 tags each chapter, section, paragraph, sentence and word of the text.

Referring to FIG. 10, an outline browser 204 allows the user to navigate through the hierarchy of the book. For each object the browser will provide a summary. Each time the user navigates to a new chapter, the system gives the chapter number and the title. Each new section provides a section number and a title. When the user navigates to a particular paragraph, the system provide the first sentence of the paragraph so that the user can determine whether they want to review the contents of the paragraph. The system provides the first phrase of each new sentence as a sentence summary.

The system creates the hierechy by locating at each letter in the text. If there is a space after the letter, the combination of preceding letters is listed as a word. If there is a period, question mark or exclamation point after the word, the combination of preceding words is listed as a sentence. If a new paragraph symbol is found, then the preceding combination of sentences are listed as a paragraph. Sections and chapters are listed in the same manner.

The user can navigate through the outline browser 204 to reach a particular portion of the text. The user can move to the previous object of the same type (eg. from chapter 2 to chapter 1) by pressing the previous (7) button, or go to the next object of the same type by pressing the next button (9). The user can go to a higher object (eg. from paragraph to chapter) by pressing the return button (5), or go to a lower object (eg. paragraph to sentence) by pressing a select button (8). The system allows the use to navigate through a document and listen to the document text.

The text reader 206 reads the text of the present object. For example, if the user is within chapter 1, the text reader 206 will read the entire contents of chapter 1. The outline reader 208 provides an entire outline of the document by summarizing the objects in a depth first order. The speller 210 will spell each word letter by letter, first using normal alphabet (eg. "Aye", "Bee", "Cee", etc.) and then a military alphabet (eg. "Alpha", "Bravo", "Charlie", etc.). The user then hears a definition of the word from an on-line dictionary. A typical audio message within the text dialog may state "To listen to text press 1, to read the outline press 2, to spell words press 3, to browse text press 4". The user can then press one of these options or one of the static keys 0, 5–9, * or #. Table V provides a listing of the key commands, while in the different function blocks of the text audio dialog.

TABLE V

| Command | Outline Browser | Outline Reader | Text Reader | Speller | |
|---|---|---|---|---|---|
| <choice 1> | invoke outline reader | | | | 1 |
| <choice 2> | invoke speller | invoke speller | invoke speller | | 2 |
| <choice 3> | invoke outline browser | | | | 3 |
| <choice 4> | present current position | present current position | present current position | | 4 |
| <return> | move to higher level object | return to outline browser | return to outline browser | return to calling control | 5 |
| <jump> | invoke jump audio dialog | invoke jump audio dialog | invoke jump audio dialog | invoke jump audio dialog | 6 |
| <previous> | go to previous object of the same type | go to previous object in outline path | go to the previous sentence | spell previous word | 7 |
| <select> | go to the first child object | | replay the current sentence from the beginning | | 8 |
| <next> | go to next object of the same type | go to next object in outline path | go to the next sentence (skip the current sentence) | spell next word | 9 |
| <repeat> | repeat announcement | repeat announcement | repeat announcement | repeat announcement | * |
| <support> | invoke support audio dialog | invoke support audio dialog | invoke support audio dialog | invoke support audio dialog | 0 |
| <pause> | pause dialog; resume by pressing any key | pause dialog, resume by pressing any key | pause dialog; resume by pressing any key | pause dialog, resume by pressing any key | # |

The system also has an audio dialog that allows the user to read a database such as a spreadsheet. The database audio dialog allows the user to navigate the database in a row-wise fashion. The user may navigate from row to row by pressing the "next" and "previous" keys. The users can hear the values by pressing a "select" key. The user can also navigate through a calendar database which is arranged into a hierarchy that has objects such as year, month, day, hour and minute. The user can navigate through the calendar database using the choice and static keys to reach a particular time and date. The system then provides an audio message which states the contents of the calendar at that date and time ("you have an appointment with Mr. Doe"). The system may allow the calendar program to call a third party to remind the party that a meeting will occur on a particular date, or notify the party of a change in the meeting. The system may also allow the user to establish the meeting by interacting with the calendar program through a telephone handset.

The present invention thus provides a system which allows a user to access and communicate with a computer through a telephone handset. The inclusion of multiple audio dialogs, static keypad functions and a gapless audio generation mechanism provides a system that is comprehensive in scope, easy to use and provides a realistic speech quality. The system also allows a programmer to readily construct tapplets which can be utilized with the system. For example, the system allows a programmer to easily write a tapplet that can access a personal information manager marketed by Polaris under the trademark PACKRAT. The PACKRAT application supports DYNAMIC EXCHANGE MECHANISM that can be used by another application to retrieve data stored in PACKRAT. Using this mechanism, a tapplet can retrieve and present data through a plurality of audio dialogs. The present system allows a user to interface with a program such as PACKRAT through a telephone handset.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for remotely accessing a computer from a telephone handset that has an input device and an output device, comprising:

a computer to contain electronic mail, a file manager, a voice message, a database and a facsimile;

access means for providing the telephone handset input device access to one of a plurality of audio dialogs through a single phone number, said audio dialogs to access said electronic mail, said file manager, said voice message, said database and said facsimile;

speech means for generating audio messages to be transmitted from the computer to the output device of the telephone handset;

input means for retrieving messages from said electronic mail, retrieving messages from said voice message, retrieving data from said database, or reviewing, saving, and deleting files with said file manager by selecting one of said plurality of audio dialogs and providing responses to queries from said selected audio dialog through the telephone handset input device; and graphic means for selecting one of said audio dialogs through a computer keyboard.

2. The system as recited in claim 1, wherein each audio dialog contains a plurality of audio control functions.

3. The system as recited in claim 1, further comprising an answering machine which can store voice messages provided through the telephone handset.

4. The system as recited in claim 1, further comprising text means for generating an audio message which corresponds to text within a document.

5. The system as recited in claim 4, wherein said text means further includes formatter means for formatting a document into a plurality of objects.

6. The system as recited in claim 5, wherein said objects include pages, paragraphs, sentences and words.

7. The system as recited in claim 5, wherein said text means generates audio messages that identify a current object and moves to another object in response to an input from the telephone handset.

8. The system as recited in claim 5, wherein said text means generates audio messages that identify and provide an outline of said objects.

9. The system as recited in claim 4, wherein said text means includes spell means which spells a word of said text.

10. The system as recited in claim 1, wherein said input means has a static function assigned to a corresponding button on the telephone handset.

11. The system as recited in claim 10, wherein said static function includes selecting a particular audio dialog and moving back to a previously selected audio dialog.

12. The system as recited in claim 1, wherein said speech means includes a wavetask interface which combines a pre-recorded audio wave message provided by a wave engine with an audio text to speech message that is converted from electronic text by a text to speech engine.

13. The system as recited in claim 12, wherein said engines provide information as a string of buffers in response to requests from said wavetask interface, and said wavetask interface request buffers from one engine while receiving buffers from another engine.

14. The system as recited in claim 12, wherein a pre-recorded audio wave background message is mixed with an audio text to speech message.

15. A system for remotely accessing a computer from a telephone handset that has an input device and an output device, comprising:

a computer to contain electronic mail, a file manager, a voice message, a database and a facsimile;

an interface circuit to provide the telephone handset input device access to one of a plurality of audio dialogs through a single phone number, said audio dialogs to access said electronic mail, said file manager, said voice message, said database and said facsimile;

a speech circuit to generate audio messages to be transmitted from the computer to the output device of the telephone handset;

an input circuit to retrieve messages from said electronic mail, retrieve messages from said voice message, retrieve data from said database, or review, save, and delete files with said file manager by selecting one of said plurality of audio dialogs and providing responses to queries from said selected audio dialog through the telephone handset input device; and a graphical interface for selecting one of said audio dialogs through a computer keyboard.

16. The system as recited in claim 15, wherein each audio dialog contains a plurality of audio control functions.

17. The system as recited in claim 15, further comprising an answering machine which can store voice messages provided through the telephone handset.

18. The system as recited in claim 15, further comprising a text to speech engine for generating an audio message which corresponds to text within a document.

19. The system as recited in claim 18, wherein said text to speech engine further includes a formatter for formatting a document into a plurality of objects.

20. The system as recited in claim 19, wherein said objects include pages, paragraphs, sentences and words.

\* \* \* \* \*